United States Patent
Huang et al.

(10) Patent No.: US 10,260,256 B2
(45) Date of Patent: Apr. 16, 2019

(54) METHOD FOR AUTOMATICALLY SETTING AN ELECTRONIC LOCK ACCORDING TO A RIGHT HAND OR A LEFT HAND INSTALLATION

(71) Applicant: TAIWAN FU HSING INDUSTRIAL CO., LTD., Kaohsiung (TW)

(72) Inventors: Lien-Hsi Huang, Kaohsiung (TW); Wen-Chieh Lee, Kaohsiung (TW)

(73) Assignee: TAIWAN FU HSING INDUSTRIAL CO., LTD., Kaohsiung (TW)

( * ) Notice: Subject to any disclaimer, the term of this patent is extended or adjusted under 35 U.S.C. 154(b) by 167 days.

(21) Appl. No.: 15/294,913

(22) Filed: Oct. 17, 2016

(65) Prior Publication Data

US 2017/0370127 A1    Dec. 28, 2017

(30) Foreign Application Priority Data

Jun. 23, 2016    (TW) .............................. 105119810 A

(51) Int. Cl.

| *E05B 63/04* | (2006.01) |
| *E05B 17/06* | (2006.01) |
| *E05B 47/00* | (2006.01) |
| *E05B 49/00* | (2006.01) |
| *G01D 5/12* | (2006.01) |
| *E05B 47/02* | (2006.01) |

(52) U.S. Cl.
CPC .............. *E05B 63/04* (2013.01); *E05B 17/06* (2013.01); *E05B 47/0012* (2013.01); *E05B 47/026* (2013.01); *E05B 49/00* (2013.01); *G01D 5/12* (2013.01); *E05B 2047/002* (2013.01); *E05B 2047/0067* (2013.01)

(58) Field of Classification Search
CPC .......... E05B 13/10; E05B 63/04; E05B 17/06; E05B 47/0012; E05B 49/00; E05B 2047/002; E05B 47/00; G01D 5/12
USPC .......... 70/107–111, 149, 188, 189, 218, 222, 70/223, 276, 277, 278.1, 278.7, 279.1, 70/280, 462, 465, 422, 472; 292/336.3
See application file for complete search history.

(56) References Cited

U.S. PATENT DOCUMENTS

| 6,807,834 B2 | 10/2004 | Tsai |
| 7,818,984 B2 | 10/2010 | Hwang |
| (Continued) | | |

FOREIGN PATENT DOCUMENTS

| CA | 2800622 A1 * | 7/2013 | ............... G05B 1/00 |
| CN | 201460433 U | 5/2010 | |
| (Continued) | | | |

OTHER PUBLICATIONS

Chinese Office Action dated Dec. 14, 2018 for Chinese Patent Application No. 201610897809.8, 5 pages.

*Primary Examiner* — Suzanne L Barrett
(74) *Attorney, Agent, or Firm* — Jackson IPG PLLC; Demian K. Jackson

(57) ABSTRACT

No matter a latch is extended or retracted at initial state, a method for automatically determining the installation direction of an electronic lock is able to determine the electronic lock is installed on left or right hand door by driving a rotation module to rotate in first or second direction and changing the potential of a signal outputted from a micro switch depending on the rotation module whether touches the micro switch. The method is applicable for more convenient to consumer on installation of the electronic lock.

14 Claims, 18 Drawing Sheets

(56) References Cited

U.S. PATENT DOCUMENTS

| | | | | |
|---|---|---|---|---|
| 8,011,217 B2* | 9/2011 | Marschalek | ........ | E05B 47/0011 |
| | | | | 70/149 |
| 8,375,567 B2* | 2/2013 | Huang | .................... | B23P 11/00 |
| | | | | 29/428 |
| 8,686,869 B2* | 4/2014 | Sharma | .................... | G01B 7/31 |
| | | | | 292/251.5 |
| 2009/0273440 A1* | 11/2009 | Marschalek | .............. | E05B 9/08 |
| | | | | 340/5.61 |
| 2011/0185554 A1* | 8/2011 | Huang | .................... | B23P 11/00 |
| | | | | 29/428 |
| 2013/0192316 A1* | 8/2013 | McKibben | .......... | E05B 47/0001 |
| | | | | 70/278.1 |
| 2015/0308157 A1* | 10/2015 | Lin | ......................... | E05B 63/04 |
| | | | | 292/144 |

FOREIGN PATENT DOCUMENTS

| | | |
|---|---|---|
| CN | 102127993 A | 7/2011 |
| TW | I385297 | 2/2013 |
| TW | 201329328 | 7/2013 |
| TW | I531710 | 5/2016 |

\* cited by examiner

METHOD FOR AUTOMATICALLY SETTING AN ELECTRONIC LOCK ACCORDING TO A RIGHT HAND OR A LEFT HAND INSTALLATION

FIELD OF THE INVENTION

This invention generally relates to an electronic lock, and more particularly relates to a method for automatically determining the installation direction of the electronic lock.

BACKGROUND OF THE INVENTION

Conventional electronic lock actuates an electric motor by a controller to drive interior gears in rotation, and a latch is driven to extend or retract for locking or unlocking the door when the gears are rotating. Left or right hand door is determined by the installation position of rotating shaft, wherein the rotating shaft of left hand door is installed on the left side of door plank, and the electronic lock for left hand door is installed on the right side of door plank, so the electronic lock can drive the latch to extend when the electric motor drives the interior gears to rotate in clockwise direction, and can drive the latch to retract when the electric motor drives the interior gears to rotate in counterclockwise direction. In the other hand, the rotating shaft of right hand door is installed on the right side of door plank, and the electronic lock for right hand door is installed on the left side of door plank, so the electronic lock can drive the latch to retract when the electric motor drives the interior gears to rotate in clockwise direction, and can drive the latch to extend when the electric motor drives the interior gears to rotate in counterclockwise direction.

Owing to the difference of the installation direction as above mentioned, there are different electronic locks for left and right hand doors respectively, and the electric motor can rotate in correct direction to actually drive the latch retracting or extending when it receives unlocking or locking signal. However, different electronic locks for left and right hand doors will increase the costs of product development and manufacture, and the product amount is hard to control. In addition, it is inconvenient for the consumer when the installation direction of the electronic lock is incorrect.

SUMMARY

The primary object of the present invention is to drive a rotation module rotating in a first or a second direction to change a potential of a signal outputted from a micro switch for automatically determining an electronic lock is installed on left or right hand door.

A method for automatically determining the installation direction of electronic lock in the present invention comprises the steps of: (a) driving a rotation module of the electronic lock to rotate in a first direction, the rotation module touches a micro switch when the rotation module stops rotating, wherein a potential of a signal outputted from the micro switch is defined as a first potential; (b) driving the rotation module of the electronic lock to rotate in a second direction opposed to the first direction, the rotation module does not touch the micro switch when the rotation module stops rotating, wherein the potential of the signal outputted from the micro switch is defined as a second potential; (c) driving the rotation module of the electronic lock to rotate in the first direction, a controller determines the rotation module whether touches the micro switch during rotation for converting the potential of the signal outputted from the micro switch from the second potential to the first potential, and step (d) is proceeded when the rotation module touches the micro switch during rotation; and (d) the controller setting the rotation module rotating in the first direction is for latch extending.

A method for automatically determining the installation direction of electronic lock in the present invention comprises the steps of: (a) driving a rotation module of the electronic lock to rotate in a first direction, the rotation module does not touch a micro switch when the rotation module stops rotating, wherein a potential of a signal outputted from the micro switch is defined as a second potential; (b) driving the rotation module of the electronic lock to rotate in a second direction opposed to the first direction, the rotation module touches the micro switch when the rotation module stops rotating, wherein the potential of the signal outputted from the micro switch is defined as a first potential; (c) driving the rotation module of the electronic lock to rotate in the first direction, the rotation module does not touch the micro switch when the rotation module stops rotating, wherein the potential of the signal outputted from the micro switch is defined as the second potential; (d) driving the rotation module of the electronic lock to rotate in the second direction, a controller determines the rotation module whether touches the micro switch during rotation for converting the potential of the signal outputted from the micro switch from the second potential to the first potential, and step (e) is proceeded when the rotation module touches the micro switch during rotation; and (e) the controller setting the rotation module rotating in the second direction is for latch extending.

The present invention enables to determine the electronic lock is installed on left or right hand door automatically by the method for automatically determining the installation direction of the electronic lock. Owing to the electronic lock is applicable for both left and right hand door, it can decrease the costs of product design and manufacture, and it is more convenient for the consumer on installation.

DETAILED DESCRIPTION OF THE INVENTION

Figure 1:
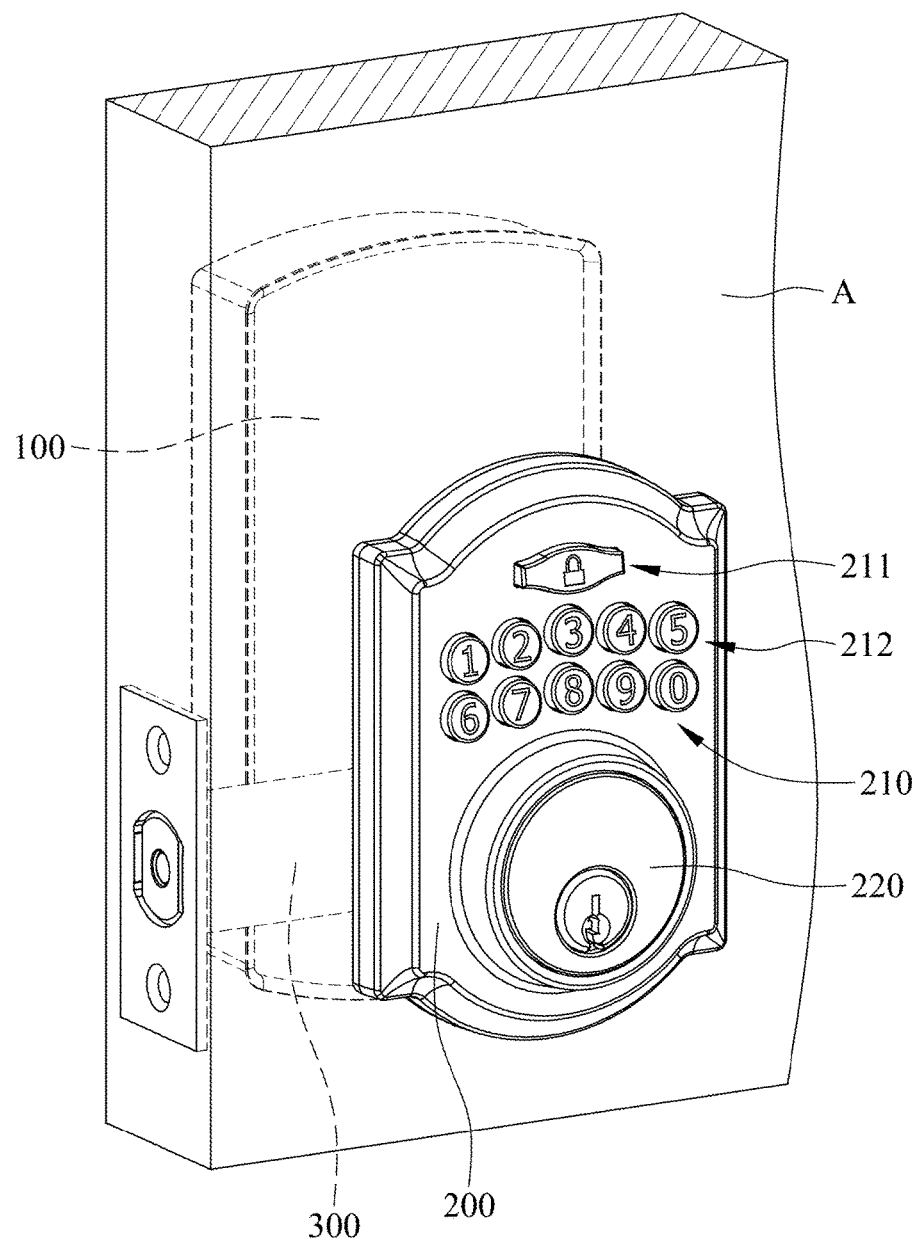
FIG. 1 is a perspective assembly diagram illustrating an electronic lock, an outer lock and a latch installed on right hand door in accordance with an embodiment of the present invention.

With reference to FIG. 1, an electronic lock 100 and an outer lock 200 are installed on a door plank A in accordance with an embodiment of the present invention, wherein the electronic lock 100 and the outer lock 200 are used for driving a latch 300 to be extended for locking, or used for driving the latch 300 to be retracted for unlocking. As shown in FIG. 1, the electronic lock 100 and the outer lock 200 are installed on a right hand door, wherein the electronic lock 100 is installed inside of the door plank A and the outer lock 200 is installed outside of the door plank A. In this embodiment, the outer lock 200 includes an operation panel 210 and a cylinder 220, wherein the operation panel 210 is electrically connected to the electronic lock 100 for sending signals to the electronic lock 100 to drive the latch 300 in operation. The operation panel 210 includes a locking button 211 and a plurality of number buttons 212, wherein the electronic lock 100 will drive the latch 300 to be extended for locking the door plank A when an user (drawing not shown) presses the locking button 211 of the outer lock 200, and the electronic lock 100 will drive the latch 300 to be retracted for unlocking the door plank A when the user inputs correct number by the number buttons 212, and the cylinder 220 is applied for unlocking or locking the door plank A by a key (drawing not shown). In other embodiment of the present invention, the outer lock 200 includes a touch panel or a wireless signal detection device used for inputting password by touching or reading key card to actuate the electronic lock 100 for the latch 300 operation, and the operation panel 210 and the cylinder 220 are not necessary.

Figure 2:
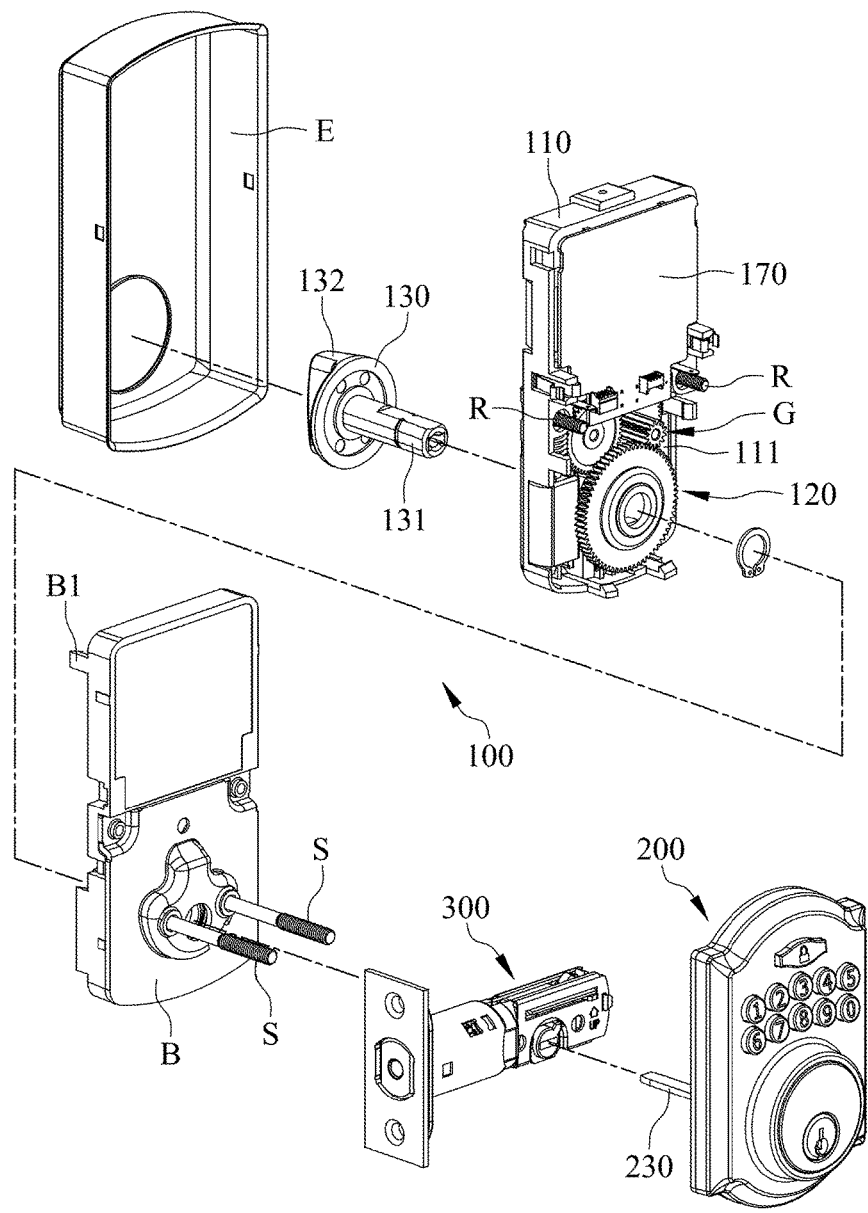
FIG. 2 is a perspective exploded diagram illustrating the electronic lock, the outer lock and the latch in accordance with the embodiment of the present invention.

With reference to FIG. 2, the electronic lock 100 includes a housing 110, a rotation module 120, a knob module 130, an escutcheon E and a back plate B, wherein the housing 110 is located between the escutcheon E and the back plate B, the rotation module 120 is installed on an installation surface 111 of the housing 110, and the escutcheon E covers the housing 110. The back plate B is coupled with the housing 110 by a plurality of engagers B1 and a plurality of fasteners R, and the back plate B is coupled with the outer lock 200 and the latch 300 by a plurality of fasteners S. The knob module 130 includes a rotation shaft 131 and a knob 132 revealed outside of the escutcheon E, wherein the rotation shaft 131 connects with the knob 132. The rotation shaft 131 is installed pivotally to the housing 110, the rotation module 120 and the back plate B, and coupled with a driving plate 230 of the outer lock 200 for synchronized rotation.

Figure 3:
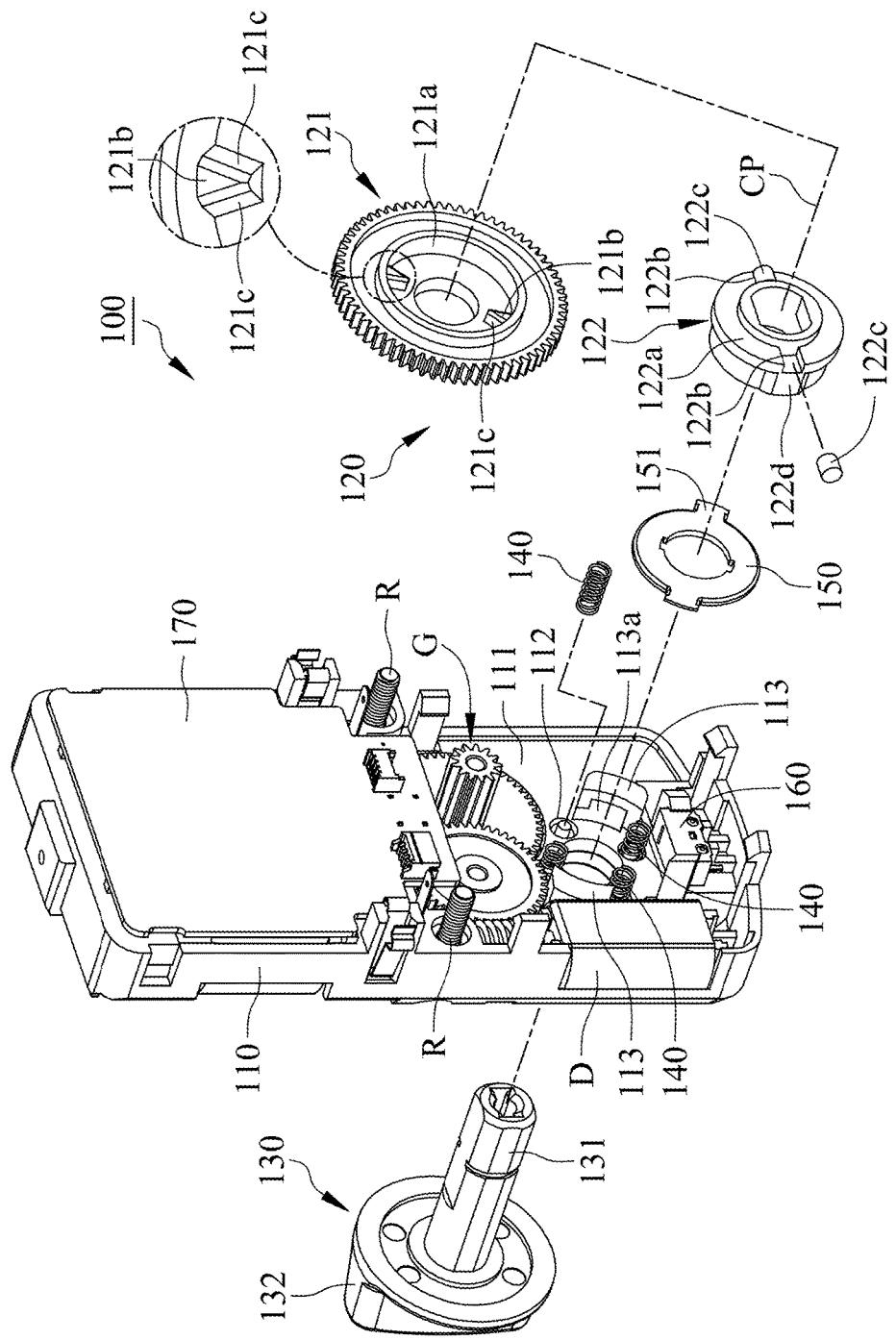
FIG. 3 is a perspective exploded diagram illustrating the electronic lock in accordance with the embodiment of the present invention.
Figure 4:
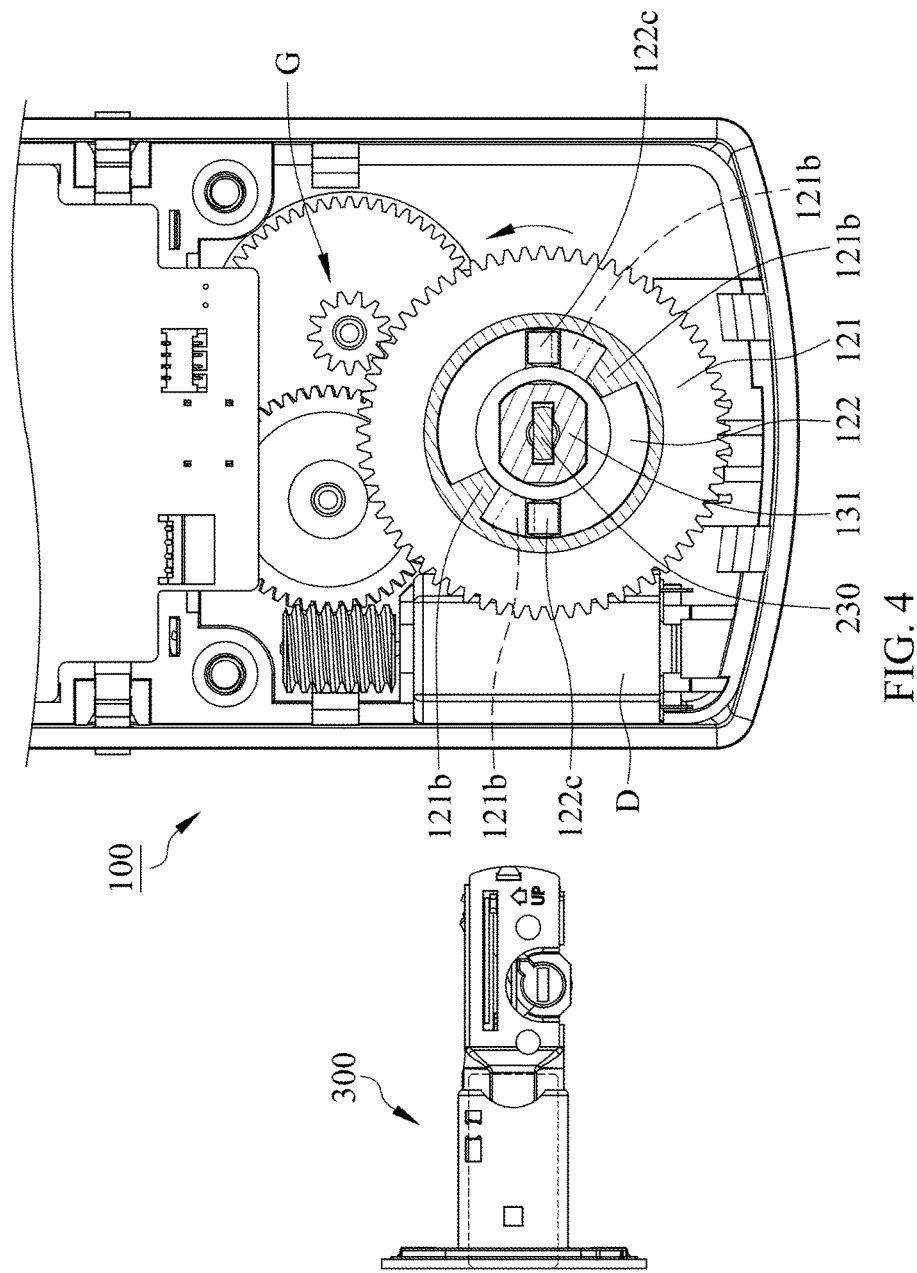
FIGS. 4 to 8 are diagrams illustrating the electronic lock operation and the latch position in accordance with the embodiment of the present invention.

With reference to FIGS. 3 and 4, the rotation module 120 includes a rotation member 121 and a driven member 122, wherein the driven member 122 is installed between the installation surface 111 and the rotation member 121. A driver D is used for driving the rotation member 121 rotating in a first direction or a second direction opposed to the first direction, wherein the first direction is clockwise and the second direction is counterclockwise in this embodiment. Direction is not limited in the present invention, and the first direction can be counterclockwise and the second direction can be clockwise in other embodiment. The driver D can be an electric motor which drives the rotation member 121 in rotation by a gear set G.

With reference to FIG. 3, the electronic lock 100 includes a plurality of elastic members 140 and a barrier plate 150, wherein the elastic members 140 are installed between the housing 110 and the driven member 122, and the barrier plate 150 is located between the driven member 122 and the elastic members 140. Preferably, the housing 110 includes a plurality of location grooves 112 and at least one engaging portion 113, wherein each of the location grooves 112 is recessed on the installation surface 111, the at least one engaging portion 113 is protruded from the installation surface 111, and wherein each of the elastic members 140 is inserted into each of the location grooves 112. The engaging portion 113 includes a guidance groove 113a, wherein a limiting protrusion 151 of the barrier plate 150 is limited within the guidance groove 113a to make the barrier plate 150 unable to rotate with the driven member 122, and also prevent the elastic members 140 from moving with the rotating driven member 122.

Figure 5:
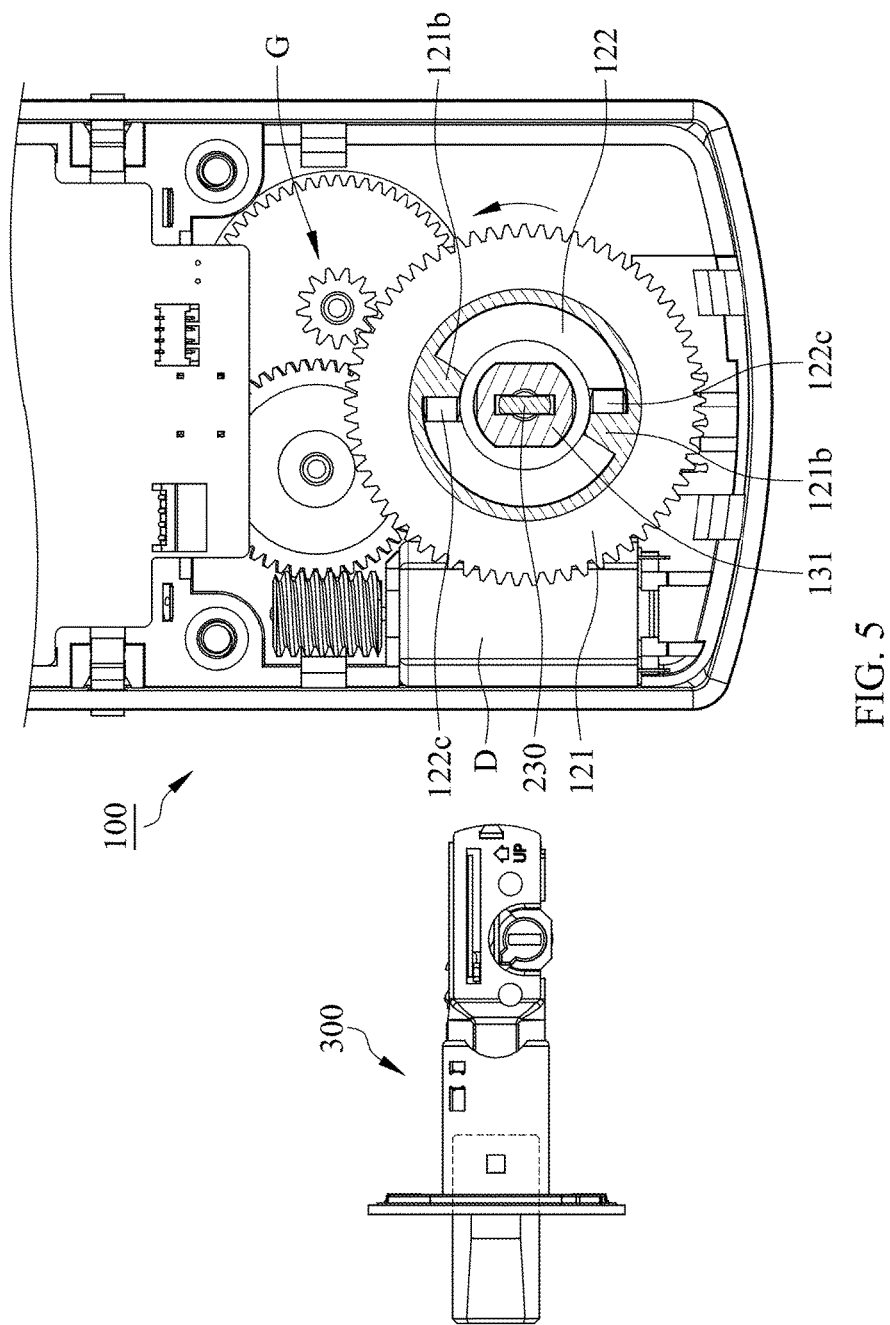
Figure 6:
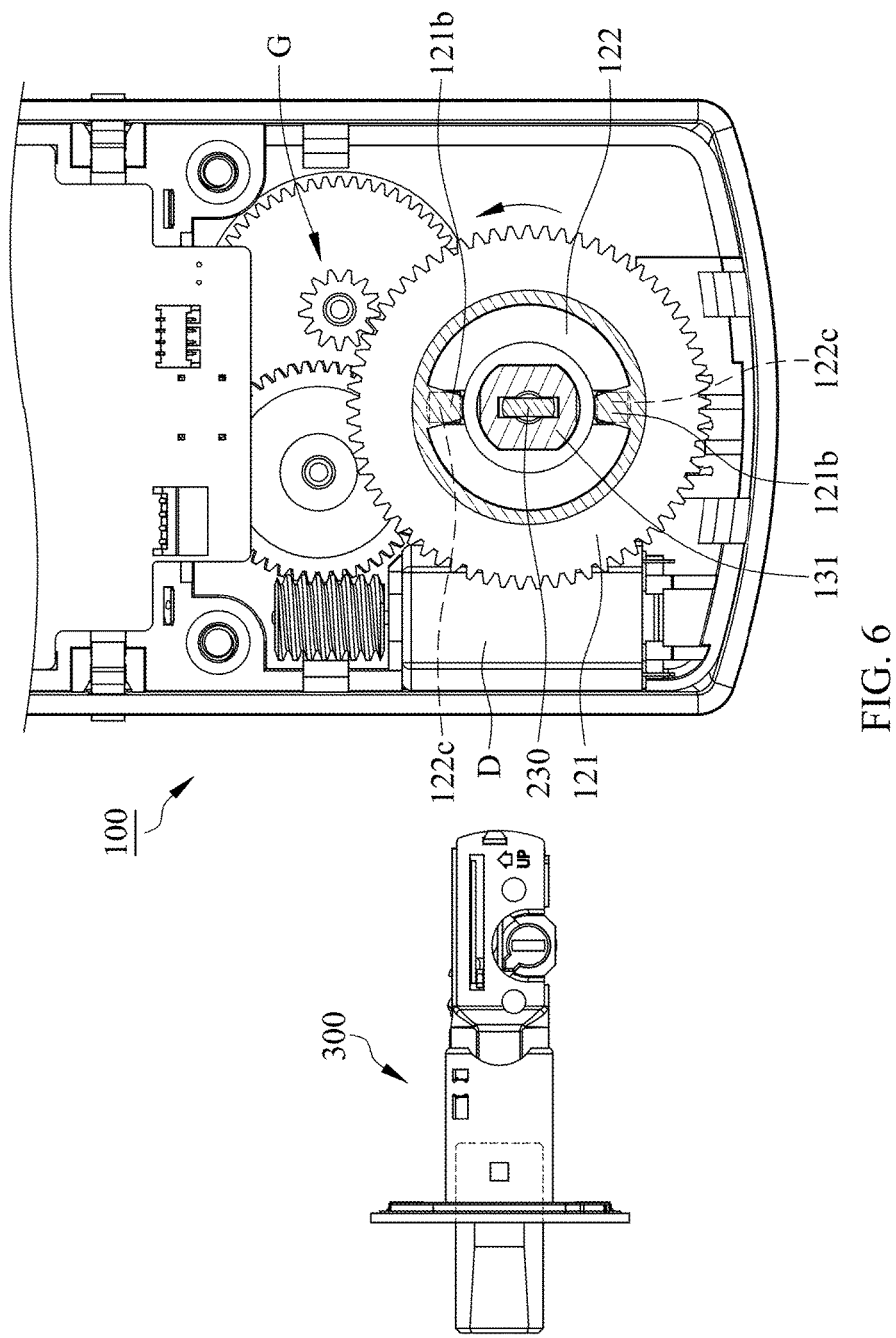
Figure 7:
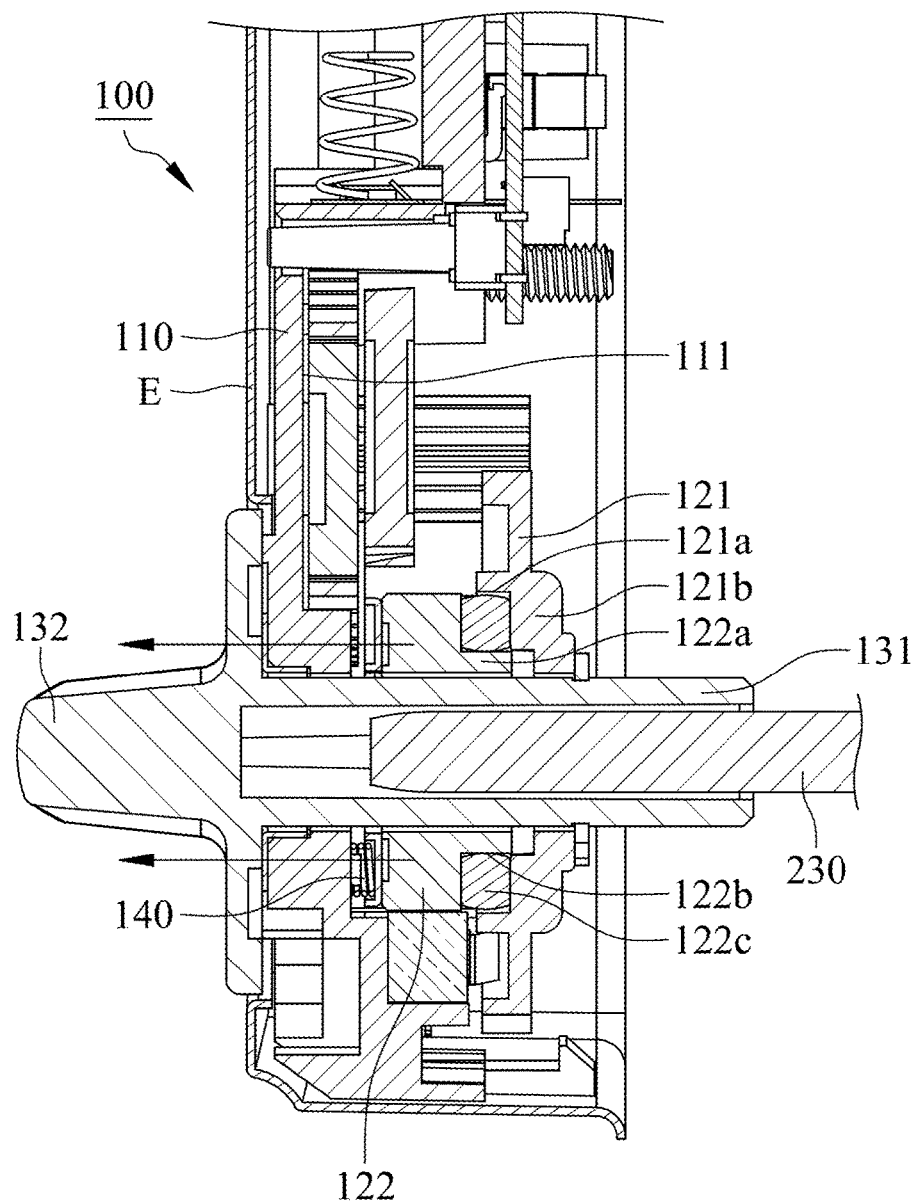
Figure 8:
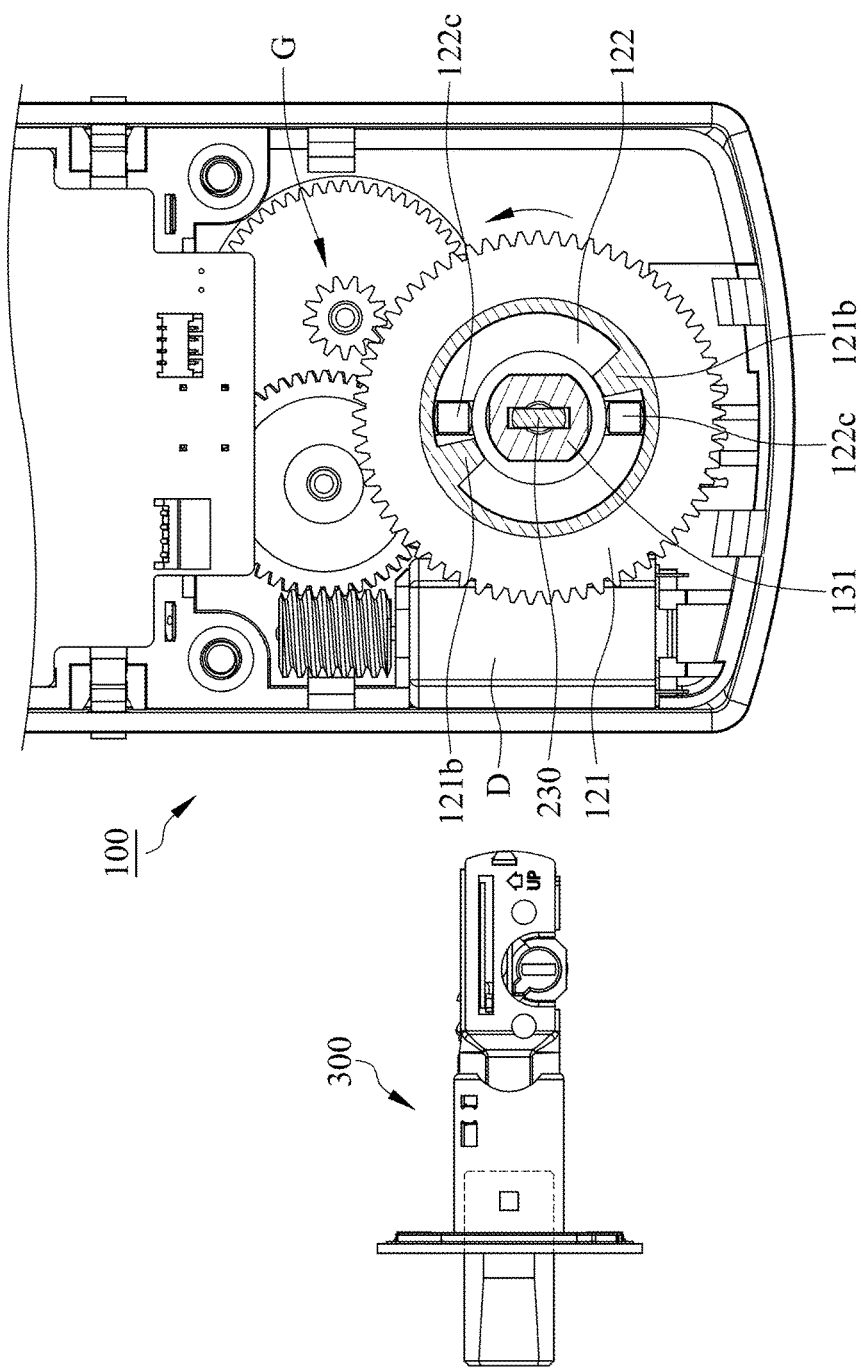

In this embodiment, the rotation member 121 includes at least one recess 121a and at least one blocking protrusion 121b, wherein the at least one blocking protrusion 121b is formed in the recess 121a. The driven member 122 includes an engaging portion 122a, at least one limiting recess 122b and at least one rolling member 122c, wherein the engaging portion 122a is engaged within the recess 121a of the rotation member 121, the at least one limiting recess 122b is recessed on the engaging portion 122a, and the at least one rolling member 122c (ball or roller) is limited in the limiting recess 122b. With reference to FIGS. 4 to 8, these diagrams are used for illustrating engagement and disengagement of the rotation member 121 with the driven member 122. With reference to FIG. 4, the blocking protrusions 121b do not contact with the rolling members 122c when the latch 300 is retracted completely (the electronic lock 100 is unlocked). Then, the blocking protrusions 121b contact with the rolling members 122c and drive the driven member 122 in synchronized rotation when the driver D in rotation drives the rotation member 121 rotating in counterclockwise direction via the gear set G (shown as broken line of FIG. 4). At this time, the driven member 122 also synchronously drives the driving plate 230 rotating in counterclockwise direction to drive the latch 300 extending outwardly until fully extended (the electronic lock 100 is locked). With reference to FIG. 5, the driving plate 230 can not continuously rotate in counterclockwise direction when the driven member 122 drives the latch 300 to be extended fully, and so the driven member 122 can not be driven to rotate by the rotation member 121. With reference to FIGS. 6 and 7, the rolling member 122c pushed by the blocking protrusion 121b leads the driven member 122 moving forward the installation surface 111 to compress the elastic members 140, and so leads the blocking protrusion 121b crosses the rolling member 122c (as shown in FIG. 8). Finally, the driven member 122 is pushed back to initial position by the elastic members 140 to drive the rotation member 121 rotating in counterclockwise direction continuously.

On the other hand, the driven member 122 is driven to rotate in clockwise direction by the rotation member 121 for retracting the latch 300 when the driver D drives the rotation member 121 rotate in clockwise direction to drive the latch 300 moving to the fully retracting position (the electronic lock 100 is unlocked) from the fully extending position (the electronic lock 100 is locked). Once the driving plate 230 can not continuously rotate in clockwise direction, the rolling member 122c is still pushed by the blocking protrusion 121b, and the blocking protrusion 121b can cross the rolling member 122c after the driven member 122 moving for continuously driving the rotation member 121 by the driver D. So the driver D is protected from overheat damage caused by the rotation member 121 which can not be driven to rotate when mechanical failure occurs or the latch 300 can not be moved (fully extending or retracting) for substantially increasing life-cycle of the electronic lock 100.

With reference to FIG. 3, the blocking protrusion 121b of the rotation member 121 has at least one slope 121c in this embodiment, and preferably, each of the blocking protrusions 121b has two slopes 121c respectively. The rolling member 122c contacts with the slope 121c of the blocking protrusion 121b when the rotation member 121 pushes the rolling member 122c to roll, and the rolling member 122c is pushed toward the installation surface 111 by the slope 121c of the blocking protrusion 121b when the driven member 122 can not be driven to rotate. Because of the slope 121c, the rolling member 122c can be pushed by the blocking protrusion 121b smoothly, and the rolling member 122c also can move back to initial position along the slop 121c after the blocking protrusion 121b crossing the rolling member 122c for achieving purposes of noise reduction, friction reduction and mechanical durability improvement.

Figure 9:
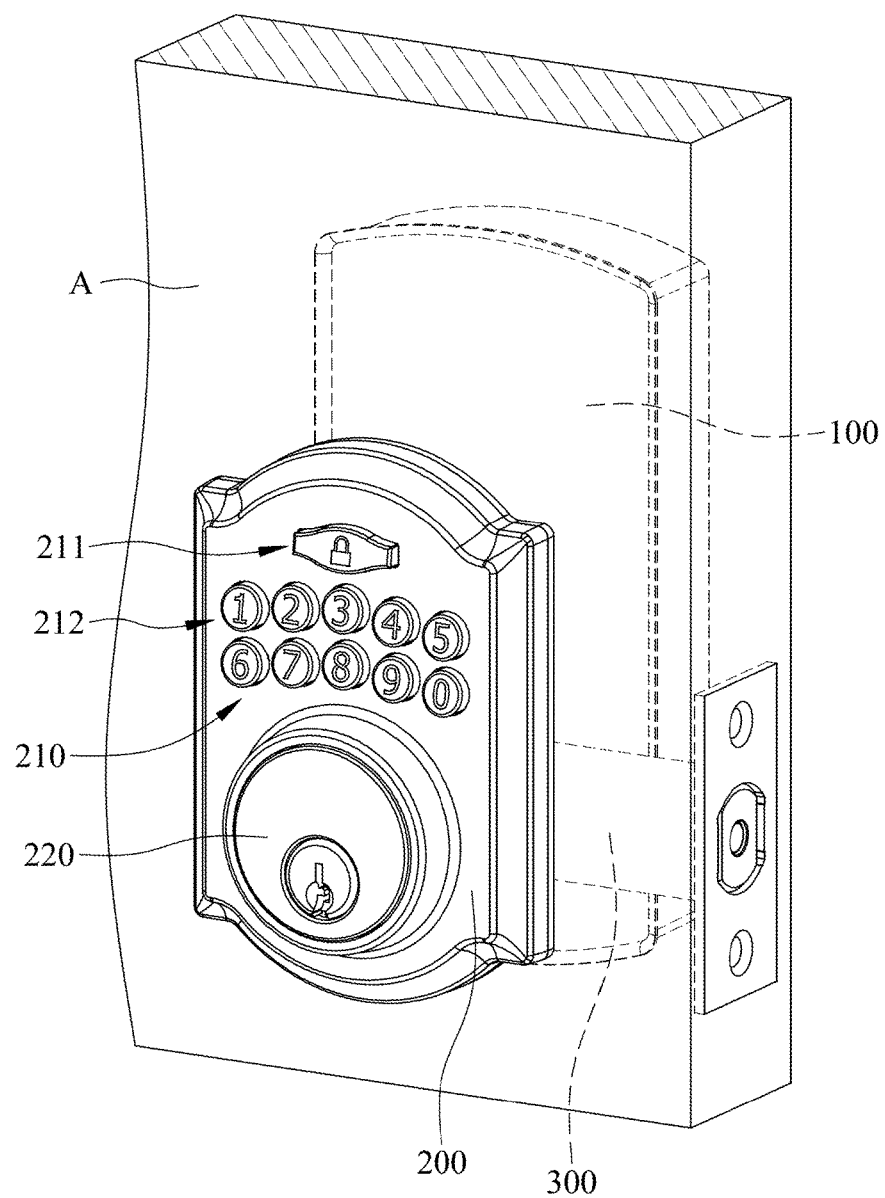
FIG. 9 is a perspective assembly diagram illustrating the electronic lock, the outer lock and the latch installed on left hand door in accordance with an embodiment of the present invention.

With reference to FIG. 9, the electronic lock 100, the outer lock 200 and the latch 300 are installed on a left hand door in accordance with an embodiment of the present invention, wherein the latch 300 is driven to extend when the rotation member 121 rotates in clockwise direction, and the latch 300 is driven to retract when the rotation member 121 rotates in counterclockwise direction.

With reference to FIG. 3, the electronic lock 100 further includes a micro switch 160 and a controller 170 electrically connected with the driver D and the micro switch 160, wherein the controller 170 is an electric controller with a control chip used for sending a driving signal to the driver D for operation. The micro switch 160 installed on the installation surface 111 of the housing 110 is used for touching with the rotation module 120 in rotation to change potential of a signal outputted from the micro switch 160. The controller 170 receives the signal outputted from the micro switch 160 and learns the rotation module 120 how to rotate according to the signal potential variation to determine the electronic lock 100 is installed on left or right hand door. Preferably, the driven member 122 includes a protruding portion 122d in this embodiment, wherein the protruding portion 122d is protruded from the driven member 122 along a radial direction of a central axial line CP. The protruding portion 122d of the driven member 122 enables to touch the micro switch 160 when the rotation module 120 is rotating.

Figure 10:
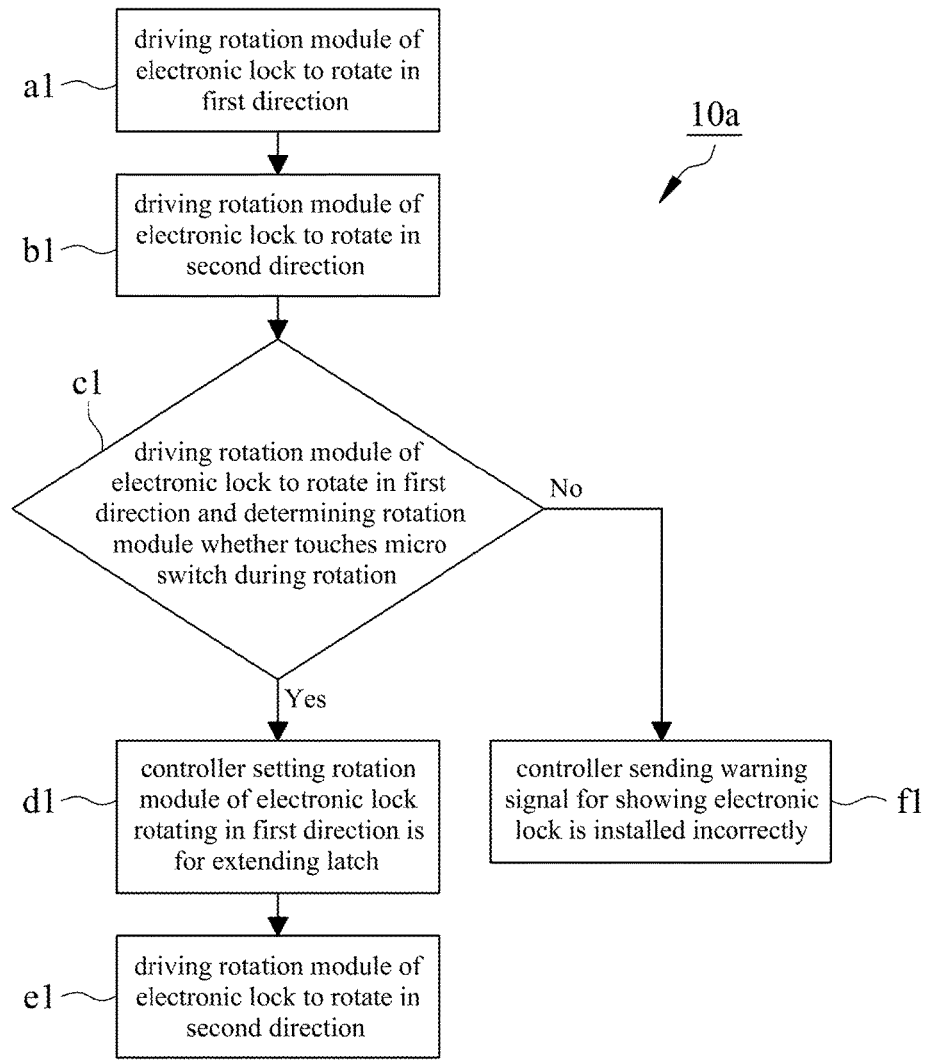
FIG. 10 is a flow chart illustrating a method for automatically determining the installation direction of the electronic lock installed on left hand door in accordance with the embodiment of the present invention.

With reference to FIGS. 1 and 9, owing to the electronic lock 100 is able to be selectively installed on left or right hand door, and the latch 300 is able to be extended or retracted initially, the controller 170 has to determine the electronic lock 100 is installed on left or right hand door according to the rotating direction of the rotation module 120 and the potential variation of the signal outputted from the micro switch 160 when the electronic lock 100 is installed on the door plank A. With reference to FIG. 10, it is a flow chart of a method 10a for automatically determining the installation direction of the electronic lock 100 installed on left hand door. FIGS. 11 to 16 are used for clearly illustrating the relation of the rotation module 120, the latch 130 and the micro switch 160, wherein only partial components are shown in these diagrams.

Figure 11:
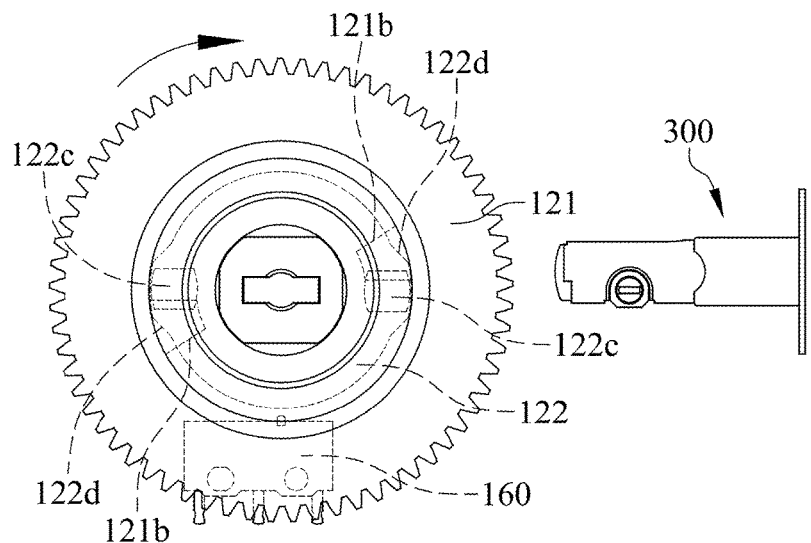
FIGS. 11 to 16 are diagrams illustrating automatically determining the installation direction of the electronic lock installed on left hand door in accordance with the embodiment of the present invention.

With reference to FIG. 11, it is the diagram showing the electronic lock 100 is installed on left hand door and the latch 300 is retracted initially.

With reference to FIGS. 10 and 11, the rotation module 120 of the electronic lock 100 is driven to rotate in the first direction in step (a1), wherein the rotation module 120 is driven by the driver D which is actuated by the controller 170 in this embodiment, and wherein the first direction is clockwise, the second direction is counterclockwise, a first potential is high (on) and a second potential is low (off). That is to say, potential of the signal outputted from the micro switch 160 is high when the protruding portion 122d of the driven member 122 touches the micro switch 160, and in the other hand, potential of the signal outputted from the micro switch 160 is low when the protruding portion 122d of the driven member 122 does not touch the micro switch 160. In other embodiment, the first potential is low and the second potential is high, so the potential levels of the first and second potentials are not limited in the present invention.

Figure 12:
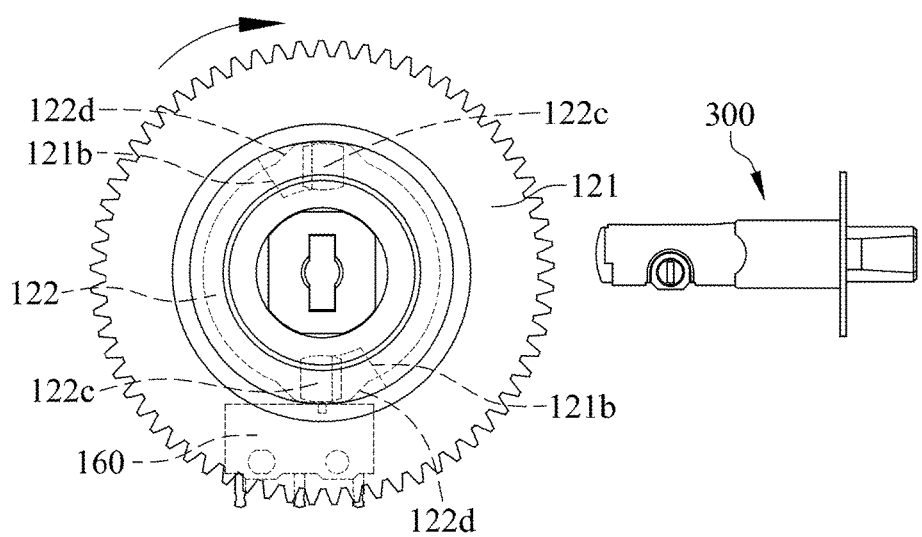
Figure 13:
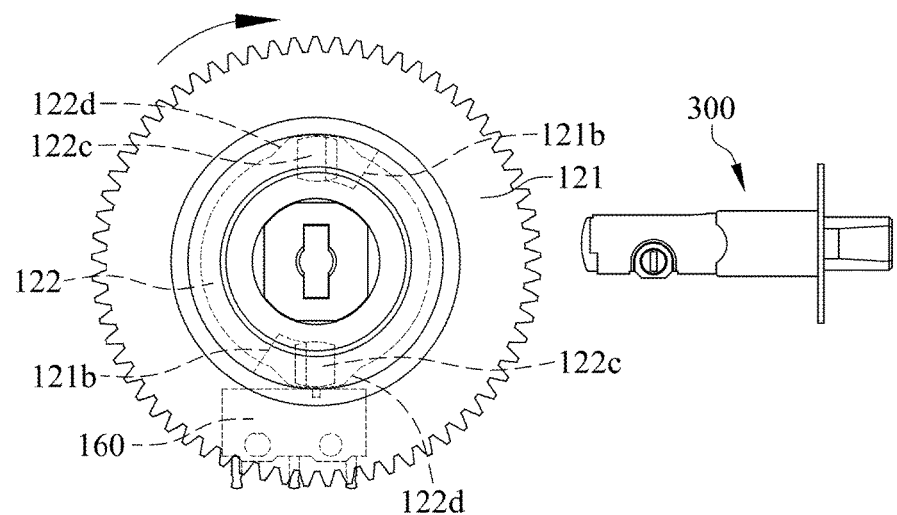

FIGS. 11 to 13 are the diagrams illustrating the rotation module 120 rotating in clockwise direction drives the latch 300 extending to right side in step (a1). Referring to FIG. 11 first, the rotation member 121 is driven to rotate in clockwise direction, and the blocking protrusion 121b contacts with the rolling member 122c to drive the driven member 122 rotate in clockwise direction synchronously for extending the latch 300. And at this time, the protruding portion 122d of driven member 122 does not touch the micro switch 160, so potential of the signal outputted from the micro switch 160 is low. Then, referring to FIG. 12, the protruding portion 122d touches the micro switch 160 when the latch 300 is driven to extend fully by the driven member 122, wherein potential of the signal outputted form the micro switch 160 is high. The rotation member 121 is blocked by the driven member 122 because the driven member 122 can not rotate in clockwise direction any more when the latch 300 is fully extended. Referring to FIG. 13, the blocking protrusion 121b crosses the rolling member 122c because of engagement and disengagement between the rotation member 121 and the driven member 122, and the rotation module 120 stops rotating, wherein the potential of the signal outputted from the micro switch 160 is high.

Figure 14:
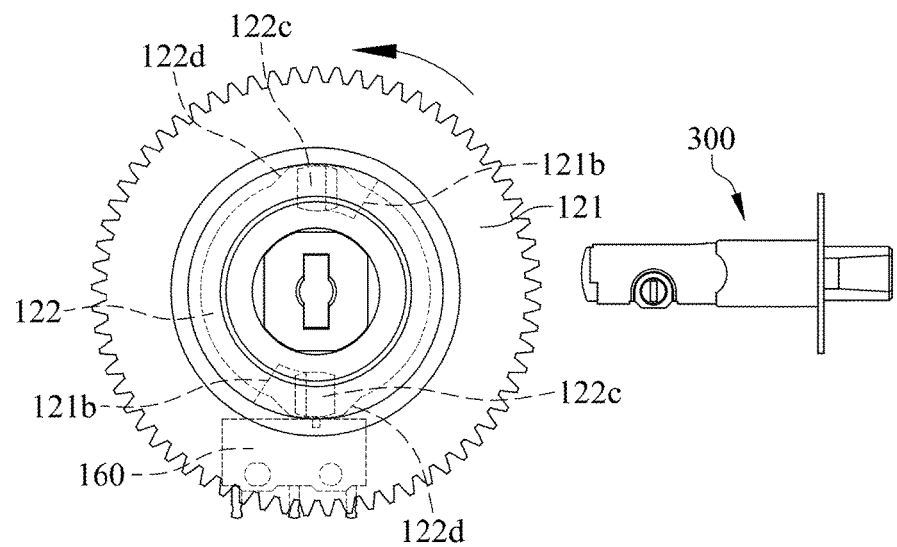
Figure 15:
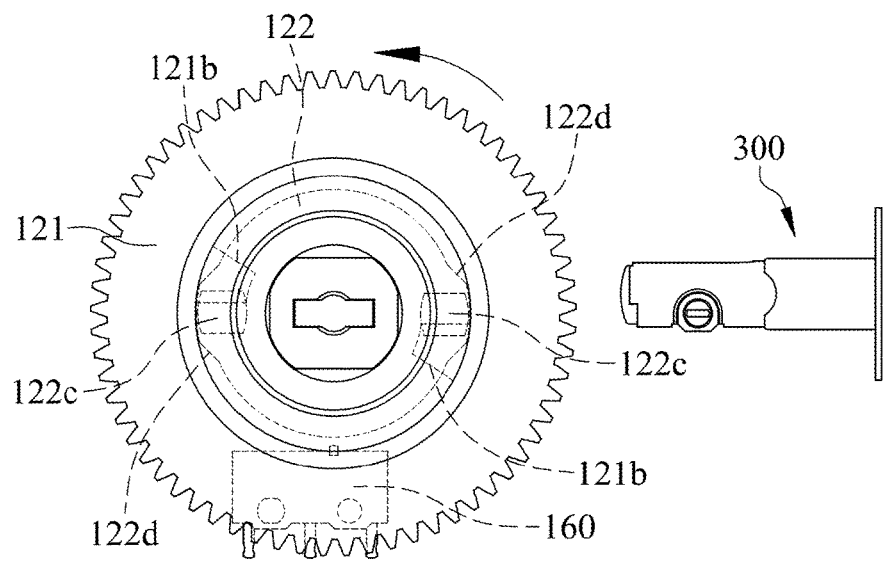
Figure 16:
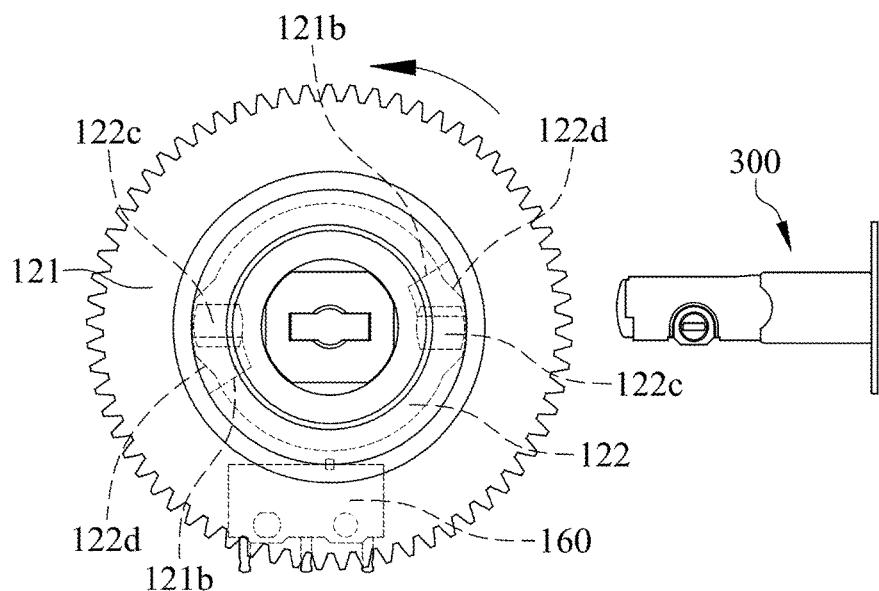

With reference to FIG. 10, the rotation module 120 of the electronic lock 100 is driven to rotate in counterclockwise direction in step (b1). FIGS. 14 to 16 following with FIG. 13 are the diagrams illustrating the driver D actuated by the controller 170 drives the rotation module 120 to rotate in counterclockwise direction for retracting the latch 300 to left side. Referring to FIG. 14 first, the latch 300 is extended, so the rotation module 120 can rotate in counterclockwise direction to drive the latch 300 retracting to left side. Referring to FIG. 15, the protruding portion 122d departs from and does not touch the micro switch 160 when the latch 300 is driven to retract fully by the driven member 122, wherein potential of the signal outputted from the micro switch 160 is low. The rotation member 121 is blocked by the driven member 122 because the driven member 122 can not rotate in counterclockwise direction any more when the latch 300 is fully retracted. Referring to FIG. 16, the blocking protrusion 121b crosses the rolling member 122c because of engagement and disengagement between the rotation member 121 and the driven member 122, and the rotation module 120 stops rotating, wherein the potential of the signal outputted from the micro switch 160 is low.

With reference to FIG. 10, the rotation module 120 of the electronic lock 100 is driven to rotate in clockwise direction and the controller 170 determines the rotation module 120 whether touches the micro switch 160 during rotation in step (c1), wherein the rotation module 120 in clockwise rotation is shown in FIGS. 11 to 13, the rotation module 120 in counterclockwise rotation is shown in FIGS. 14 to 16, and the following description is not presented with the diagrams one by one. The rotation module 120 in clockwise rotation enables to drive the latch 300 extending to right side owing to the latch 300 is fully retracted at this time. Then, the protruding portion 122*d* touches the micro switch 160 when the latch 300 is driven to extend fully by the driven member 122, wherein potential of the signal outputted from the micro switch 160 is high. The rotation member 121 is blocked by the driven member 122 because the driven member 122 can not rotate in clockwise direction any more when the latch 300 is extended fully, so the blocking protrusion 121*b* enables to cross the rolling member 122*c* because of engagement and disengagement between the rotation member 121 and the driven member 122, and the rotation module 120 stops rotating, wherein the potential of the signal outputted from the micro switch 160 is high.

Based on the above-mentioned description, the electronic lock 100 is determined to be installed on left hand door owing to the rotation module 120 touches the micro switch 160 during rotation, therefore, step (d1) is performed after step (c1). The controller 170 sets the rotation module 120 in clockwise rotation is used for extending the latch 300, and sets the rotation module 120 in counterclockwise rotation is used for retracting the latch 300 for completing the installation setting of the electronic lock 100.

Furthermore, the latch 300 is extended and the electronic lock 100 is locked after setting the controller 170, so step (e1) is performed preferably to drive the rotation module 120 of the electronic lock 100 to rotate in counterclockwise direction to retract the latch 300 for unlocking the electronic lock 100.

With reference to FIG. 10, if the rotation module 120 does not touch the micro switch 160 in step (c1), step (f1) is performed preferably after step (c1) to make the controller 170 send a warning signal for showing the electronic lock 100 is installed incorrectly.

Owing to the initial state of the latch 300 is able to be extended or retracted, FIG. 12 is used for illustrating the electronic lock 100 is installed on left hand door and the initial state of the latch 300 is extended.

With reference to FIGS. 10 and 12, the rotation module 120 of the electronic lock 100 is driven to rotate in clockwise direction in step (a1). Owing to the initial state of the latch 300 is extended and the driven member 122 can not rotate in clockwise direction any more, the rotation member 121 is blocked by the driven member 122. Referring to FIG. 13, the blocking protrusion 121*b* crosses the rolling member 122*c* because of engagement and disengagement between the rotation member 121 and the driven member 122, and the rotation module 120 stops rotating, wherein the potential of the signal outputted from the micro switch 160 is high.

Then, the rotation module 120 of the electronic lock 100 is driven to rotate in counterclockwise direction in step (b1), and the rotation module 120 can rotate in counterclockwise direction to retract the latch 300 because the initial state of the latch 300 is extended. The protruding portion 122*d* departs from and does not touch the micro switch 160 when the driven member 122 drives the latch 300 to retract fully, wherein the potential of the signal outputted from the micro switch 160 is low. The rotation member 121 is blocked by the driven member 122 because the driven member 122 can not rotate in counterclockwise direction any more when the latch 300 is retracted fully, so the blocking protrusion 121*b* crosses the rolling member 122*c* because of engagement and disengagement between the rotation member 121 and the driven member 122, and the rotation module 120 stops rotating, wherein the potential of the signal outputted from the micro switch 160 is low.

In step (c1), the rotation module 120 of the electronic lock 100 is driven to rotate in clockwise direction and the controller 170 determines the rotation module 120 whether touches the micro switch 160 during rotation. Because the latch 300 is fully retracted at this time, the rotation module 120 can rotate in clockwise direction to drive the latch 300 extending to right side until the latch 300 is driven to extend fully by the driven member 122, and the protruding portion 122*d* touches the micro switch 160, wherein the potential of the signal outputted from the micro switch 160 is high. The rotation member 121 is blocked by the driven member 122 because the driven member 122 can not rotate in clockwise direction any more when the latch 300 is extended fully, so the blocking protrusion 121*b* crosses the rolling member 122*c* because of engagement and disengagement between the rotation member 121 and the driven member 122, and the rotation module 120 stops rotating, wherein the potential of the signal outputted from the micro switch 160 is high.

In the same way, the electronic lock 100 is determined to be installed on left hand door because the rotation module 120 touches the micro switch 160 during rotation, so step (d1) is performed after step (c1). The controller 170 sets the rotation module 120 in clockwise rotation is used for extending the latch 300, and sets the rotation module 120 in counterclockwise rotation is used for retracting the latch 300 for completing the installation setting of the electronic lock 100.

Owing to the latch 300 is extended and the electronic lock 100 is locked after setting the controller 170, step (e1) is performed preferably to drive the rotation module 120 of the electronic lock 100 to rotate in counterclockwise direction to retract the latch 300 for unlocking the electronic lock 100.

With reference to FIG. 10, if the rotation module 120 does not touch the micro switch 160 in step (c1), step (f1) is performed after step (c1) preferably to make the controller 170 send a warning signal for showing the electronic lock 100 is installed incorrectly.

Figure 17:
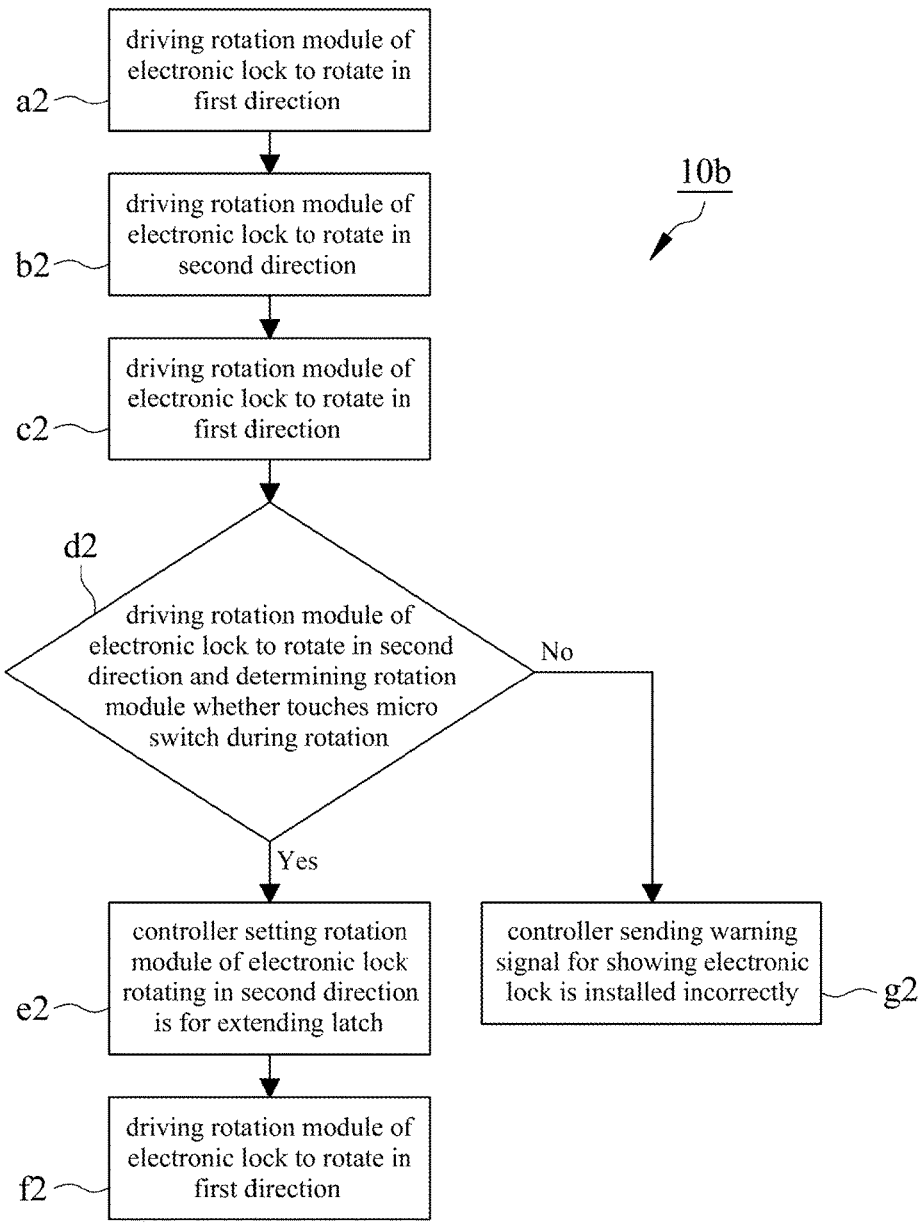
FIG. 17 is a flow chart illustrating a method for automatically determining the installation direction of the electronic lock installed on right hand door in accordance with the embodiment of the present invention.

With reference to FIG. 17, it is a flow chart of a method 10*b* for automatically determining the installation direction of the electronic lock 100 installed on right hand door. FIGS. 18 to 25 are used for clearly illustrating the relation of the rotation module 120, the latch 130 and the micro switch 160, wherein only partial components are shown in these diagrams.

Figure 18:
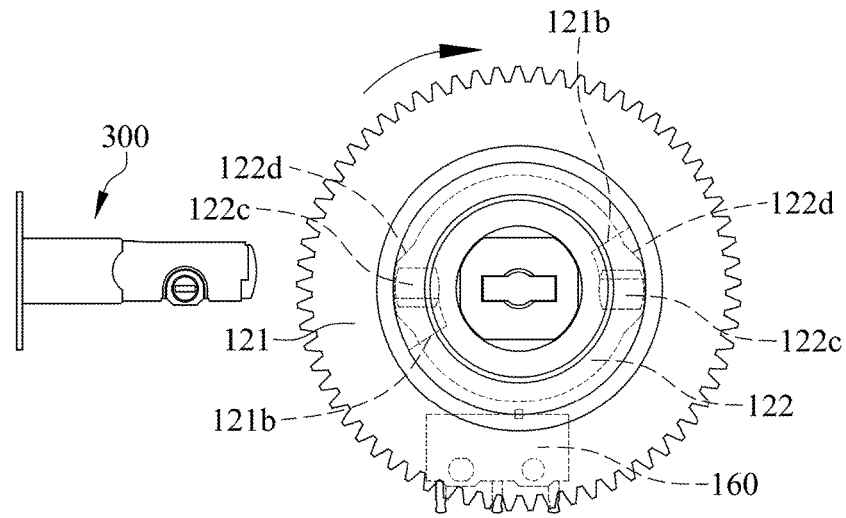
FIGS. 18 to 25 are diagrams illustrating automatically determining the installation direction of the electronic lock installed on right hand door in accordance with the embodiment of the present invention.

With reference to FIG. 18, it is the diagram showing the electronic lock 100 is installed on right hand door and the initial state of the latch 300 is retracted.

Figure 19:
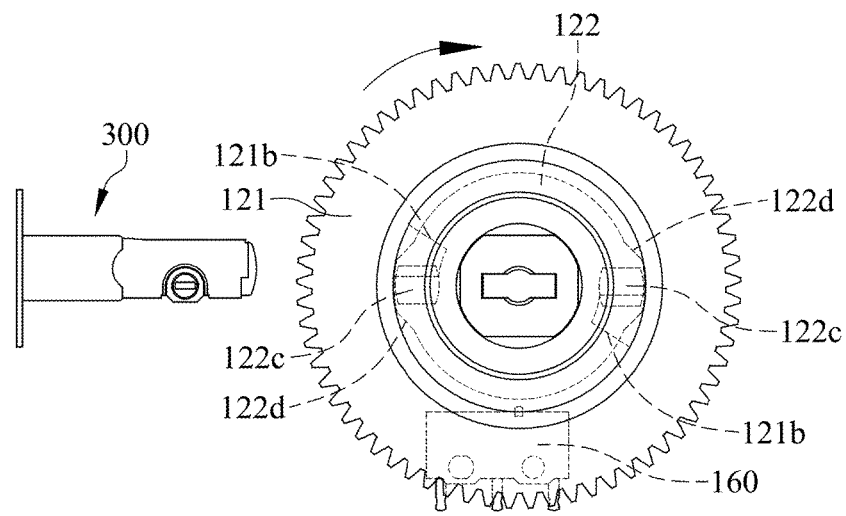

With reference to FIGS. 17 and 18, the rotation module 120 of the electronic lock 100 is driven to rotate in clockwise direction in step (a2), and the rotation member 121 is blocked by the driven member 122 because the driven member 122 can not rotate in clockwise direction any more when the initial state of the latch 300 is retracted. Referring to FIG. 19, owing to the driven member 122 does not touch the micro switch 160, the blocking protrusion 121*b* crosses the rolling member 122*c* because of engagement and disengagement between the rotation member 121 and the driven member 122, and the rotation module 120 stops rotating, wherein the potential of the signal outputted from the micro switch 160 is low.

Figure 20:
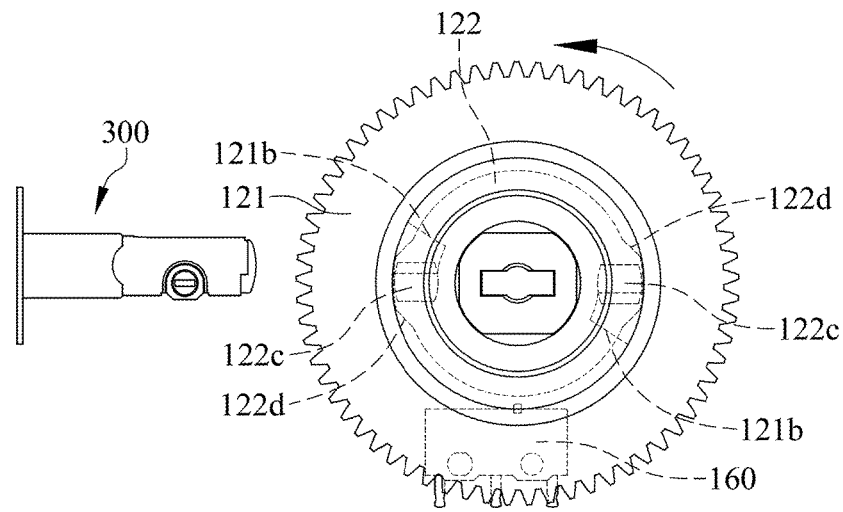
Figure 21:
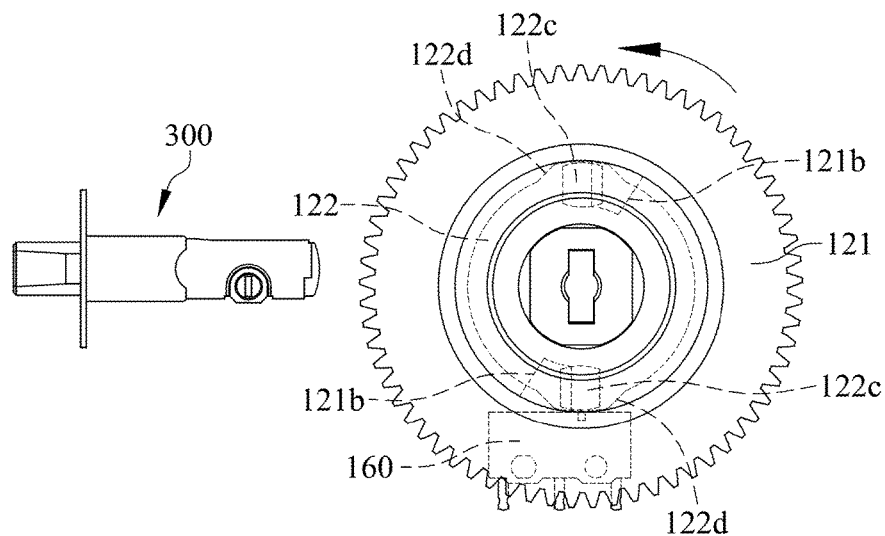
Figure 22:
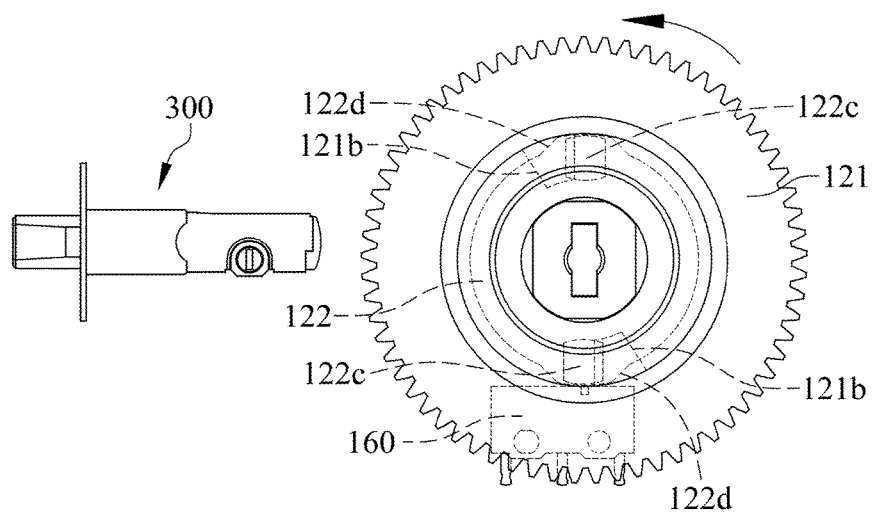

With reference to FIG. 17, the rotation module 120 of the electronic lock 100 is driven to rotate in counterclockwise direction is step (b2). FIGS. 20 to 22 following with FIG. 19 are the diagrams illustrating the driver D actuated by the controller 170 drives the rotation module 120 to rotate in counterclockwise direction for extending the latch 300 to left side. Referring to FIG. 20 first, the latch 300 is retracted, so the rotation module 120 can rotate in counterclockwise direction to drive the latch 300 extending to left side. Referring to FIG. 21, the protruding portion 122d touches the micro switch 160 when the latch 300 is driven to extend fully by the driven member 122, wherein the potential of the signal outputted from the micro switch 160 is high. The rotation member 121 is blocked by the driven member 122 because the driven member 122 can not rotate in counterclockwise direction any more when the latch 300 is fully extended. Referring to FIG. 22, the blocking protrusion 121b crosses the rolling member 122c because of engagement and disengagement between the rotation member 121 and the driven member 122, and the rotation module 120 stops rotating, wherein the potential of the signal outputted from the micro switch 160 is high.

Figure 23:
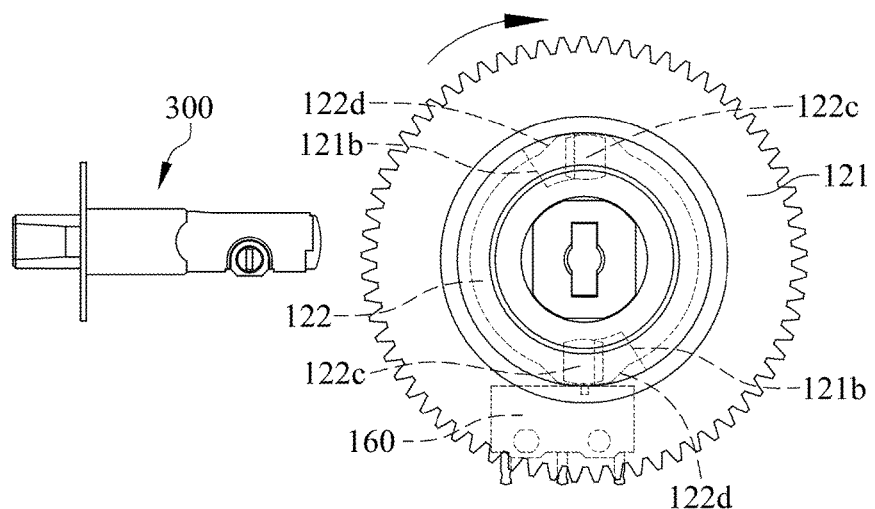
Figure 24:
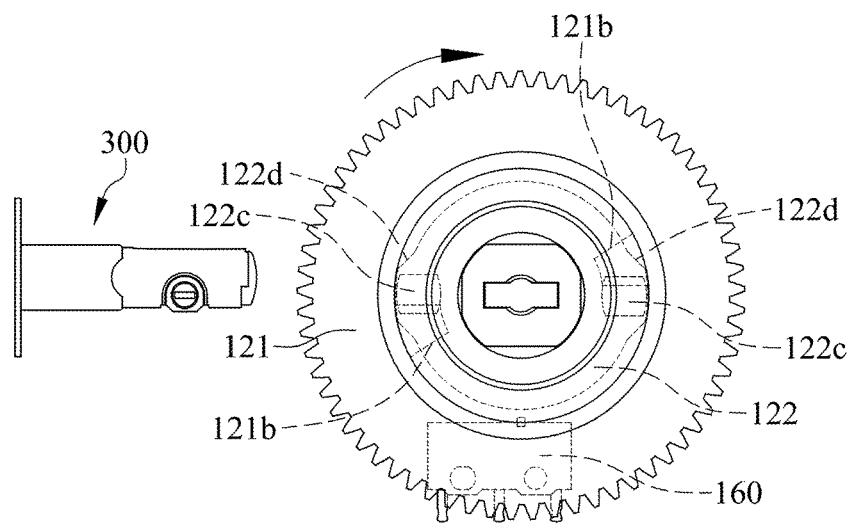
Figure 25:
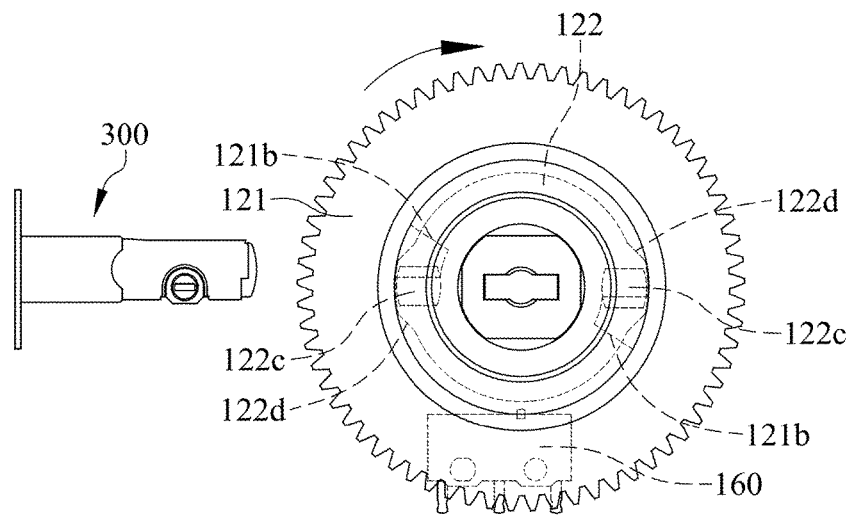

With reference to FIG. 17, the rotation module 120 of the electronic lock 100 is driven to rotate in clockwise direction in step (c2). FIGS. 23 to 25 following with FIG. 22 are the diagrams illustrating the driver D actuated by the controller 170 drives the rotation module 120 to rotate in clockwise direction for retracting the latch 300 to right side. Referring to FIG. 23 first, the latch 300 is extended, so the rotation module 120 can rotate in clockwise direction to drive the latch 300 retracting to right side. Referring to FIG. 24, the protruding portion 122d departs from and does not touch the micro switch 160 when the latch 300 is driven to retract fully by the driven member 122, wherein the potential of the signal outputted from the micro switch 160 is low. The rotation member 121 is blocked by the driven member 122 because the driven member 122 can not rotate in clockwise direction any more when the latch 300 is fully retracted. Referring to FIG. 25, the blocking protrusion 121b crosses the rolling member 122c because of engagement and disengagement between the rotation member 121 and the driven member 122, and the rotation module 120 stops rotating, wherein the potential of the signal outputted from the micro switch 160 is low.

With reference to FIG. 17, the rotation module 120 of the electronic lock 100 is driven to rotate in counterclockwise direction and the controller 170 determines the rotation module 120 whether touches the micro switch 160 during rotation in step (d2), wherein the rotation module 120 in clockwise rotation is shown in FIGS. 23 to 25, the rotation module 120 in counterclockwise rotation is shown in FIGS. 20 to 22, and the following description is not presented with the diagrams one by one. The rotation module 120 in counterclockwise rotation enables to drive the latch 300 extending to left side owing to the latch 300 is fully retracted at this time. Then, the protruding portion 122d touches the micro switch 160 when the latch 300 is driven to extend fully by the driven member 122, wherein the potential of the signal outputted from the micro switch 160 is high. The rotation member 121 is blocked by the driven member 122 because the driven member 122 can not rotate in counterclockwise direction any more when the latch 300 is extended fully, so the blocking protrusion 121b crosses the rolling member 122c because of engagement and disengagement between the rotation member 121 and the driven member 122, and the rotation module 120 stops rotating, wherein the potential of the signal outputted from the micro switch 160 is high.

Based on the above-mentioned description, the electronic lock 100 is determined to be installed on right hand door owing to the rotation module 120 touches the micro switch 160 during rotation, so step (e2) is performed after step (d2). The controller 170 sets the rotation module 120 in counterclockwise rotation is used for extending the latch 300, and sets the rotation module 120 in clockwise rotation is used for retracting the latch 300 for completing the installation setting of the electronic lock 100.

With reference to FIG. 17, owing to the latch 300 is extended and the electronic lock 100 is locked after setting the controller 170, step (f2) is preferably performed after step (e2) to drive the rotation module 120 of the electronic lock 100 to rotate in clockwise direction to retract the latch 300 for unlocking the electronic lock 100.

With reference to FIG. 17, if the rotation module 120 does not touch the micro switch 160 during rotation in step (d2), step (g2) is performed preferably to make the controller 170 send a warning signal for showing the electronic lock 100 is installed incorrectly.

Owing to the initial state of the latch 300 is able to be extended or retracted, FIG. 23 is used for illustrating the electronic lock 100 is installed on right hand door and the initial state of the latch 300 is extended.

With reference to FIGS. 17 and 23, the rotation module 120 of the electronic lock 100 is driven to rotate in clockwise direction in step (a2). Referring to FIG. 23, the rotation module 120 enables to rotate in clockwise direction to retract the latch 300 to right side owing to the initial state of the latch 300 is extended. Referring to FIG. 24, the protruding portion 122d departs from and does not touch the micro switch 160 when the latch 300 is drive to retract fully by the driven member 122, wherein the potential of the signal outputted from the micro switch 160 is low. The rotation member 121 is blocked by the driven member 122 because the driven member 122 can not rotate in clockwise direction anymore when the latch 300 is retracted fully. Referring to FIG. 25, the blocking protrusion 121b crosses the rolling member 122c because of engagement and disengagement between the rotation member 121 and the driven member 122, and the rotation module 120 stops rotating, wherein the potential of the signal outputted from the micro switch 160 is low.

Then, the rotation module 120 of the electronic lock 100 is driven to rotate in counterclockwise direction in step (b2). The rotation module 120 enables to rotate in counterclockwise direction to extend the latch 300 to left side owing to the latch 300 is retracted at this time. The protruding portion 122d touches the micro switch 160 when the driven member 122 drives the latch 300 to extend fully, wherein the potential of the signal outputted from the micro switch 160 is high. The rotation member 121 is blocked by the driven member 122 because the driven member 122 can not rotate in counterclockwise direction any more when the latch 300 is extended fully, so the blocking protrusion 121b crosses the rolling member 122c because of engagement and disengagement between the rotation member 121 and the driven member 122, and the rotation module 120 stops rotating, wherein the potential of the signal outputted from the micro switch 160 is high.

Then, the rotation module 120 of the electronic lock 100 is driven to rotate in clockwise direction in step (c2). The rotation module 120 enables to rotate in clockwise direction to retract the latch 300 to right side because the latch 300 is extended. The protruding portion 122d departs from and does not touch the micro switch 160 when the driven member 122 drives the latch 300 to retract fully, wherein the potential of the signal outputted from the micro switch 160 is low. The rotation member 121 is blocked by the driven member 122 because the driven member 122 can not rotate in clockwise direction any more when the latch 300 is retracted fully, so the blocking protrusion 121b crosses the rolling member 122c because of engagement and disengagement between the rotation member 121 and the driven member 122, and the rotation module 120 stops rotating, wherein the potential of the signal outputted from the micro switch 160 is low.

In step (d2), the rotation module 120 of the electronic lock 100 is driven to rotate in counterclockwise direction and the controller 170 determines the rotation module 120 whether touches the micro switch 160 during rotation. The rotation module 120 enables to rotate in counterclockwise direction to extend the latch 300 to left side owing to the latch 300 is retracted at this time. And then, the protruding portion 122d touches the micro switch 160 when the driven member 122 drives the latch 300 to extend fully, wherein the potential of the signal outputted from the micro switch 160 is high. The rotation member 121 is blocked by the driven member 122 because the driven member 122 can not rotate in counterclockwise direction any more when the latch 300 is extended fully, so the blocking protrusion 121b crosses the rolling member 122c because of engagement and disengagement between the rotation member 121 and the driven member 122, and the rotation module 120 stops rotating, wherein the potential of the signal outputted from the micro switch 160 is high.

In the same way, the electronic lock 100 is determined to be installed on right hand door owing to the rotation module 120 touches the micro switch 160 during rotation, so step (e2) is performed after step (d2). The controller 170 sets the rotation module 120 in counterclockwise rotation is used for extending the latch 300, and sets the rotation module 120 in clockwise rotation is used for retracting the latch 300 for completing the installation setting of the electronic lock 100.

With reference to FIG. 17, owing to the latch 300 is extended and the electronic lock 100 is locked after setting the controller 170, step (f2) is preferably performed after step (e2) to drive the rotation module 120 of the electronic lock 100 to rotate in clockwise direction to retract the latch 300 for unlocking the electronic lock 100.

With reference to FIG. 17, if the rotation module 120 does not touch the micro switch 160 during rotation in step (d2), step (g2) is performed after step (d2) preferably to make the controller 170 send a warning signal for showing the electronic lock 100 is installed incorrectly.

The methods 10a and 10b for automatically determining the installation direction of the electronic lock 100 of the present invention can automatically determine the electronic lock 100 is installed on left or right hand door. The electronic lock 100 of the present invention is both applicable for left and right hand door, so the costs of product design and manufacture can be decreased, and it is convenient for the consumer on installation. In addition, only one micro switch 160 is necessary to determine the electronic lock 100 is installed on left or right hand door through the methods 10a and 10b for automatically determining the installation direction of the electronic lock 100, so the manufacturing cost and total volume of the electronic lock 100 can be decrease.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A method for automatically setting a rotation module of an electronic lock to drive a latch to extend and retract according to a right hand or a left hand installation comprising the steps of:
    (a) driving the rotation module of the electronic lock to rotate in a first direction, wherein the rotation module touches a micro switch when the rotation module stops rotating and wherein a potential of a signal outputted from the micro switch is defined as a first potential;
    (b) driving the rotation module of the electronic lock to rotate in a second direction opposed to the first direction, wherein the rotation module does not touch the micro switch when the rotation module stops rotating and wherein the potential of the signal outputted from the micro switch is defined as a second potential;
    (c) driving the rotation module of the electronic lock to rotate in the first direction again, wherein a controller determines whether the rotation module touches the micro switch during rotation thereby converting the potential of the signal outputted from the micro switch from the second potential to the first potential, and performing step (d) when the rotation module touches the micro switch during rotation; and
    (d) defining rotating in the first direction for extending the latch.

2. The method of claim 1 further comprising step (e) driving the rotation module of the electronic lock to rotate in the second direction again for retracting the latch after step (d).

3. The method of claim 1 further comprising step (f) sending a warning signal via the controller showing the electronic lock is installed incorrectly when the rotation module does not touch the micro switch during rotation in step (c).

4. The method of claim 1, wherein the rotation module includes a rotation member and a driven member having a protruding portion used for touching the micro switch selectively, the rotation member is driven to rotate by a driver, and the rotation member in rotation drives the driven member to rotate, and wherein the rotation member rotates relative to the driven member because of engagement and disengagement between the rotation member and the driven member when the rotation member is unable to drive the driven member in rotation.

5. The method of claim 4, wherein the rotation member includes at least one recess and at least one blocking protrusion located in the recess, wherein the driven member includes an engaging portion, at least one limiting recess and at least one rolling member, the engaging portion is engaged within the recess, the at least one limiting recess is recessed on the engaging portion, and the at least one rolling member is limited in the limiting recess, and wherein the blocking protrusion contacts with the rolling member for driving the driven member in rotation when the rotation member is rotating.

6. The method of claim 5, wherein the electronic lock includes a housing and a plurality of elastic members, the driver, the rotation member and the driven member are installed on an installation surface of the housing, the driven member is located between the installation surface and the rotation member, and the elastic members are installed between the housing and the driven member.

7. The method of claim 6, wherein the blocking protrusion of the rotation member comprises a slope, the at least one rolling member contacts with the slope of the blocking protrusion when the rotation member drives the driven member to rotate, and wherein the at least one rolling member is pushed by the slope to make the driven member moving toward the installation surface for compressing the elastic members and making the blocking protrusion cross the rolling member when the driven member is unable to be driven to rotate.

8. A method for automatically setting a rotation module of an electronic lock to drive a latch to extend and retract according to a right hand or a left hand installation comprising the steps of:
  (a) driving the rotation module of the electronic lock to rotate in a first direction, wherein the rotation module does not touch a micro switch when the rotation module stops rotating and wherein a potential of a signal outputted from the micro switch is defined as a second potential;
  (b) driving the rotation module of the electronic lock to rotate in a second direction opposed to the first direction, wherein the rotation module touches the micro switch when the rotation module stops rotating and wherein the potential of the signal outputted from the micro switch is defined as a first potential;
  (c) driving the rotation module of the electronic lock to rotate in the first direction again, wherein the rotation module does not touch the micro switch when the rotation module stops rotating and wherein the potential of the signal outputted from the micro switch is the second potential;
  (d) driving the rotation module of the electronic lock to rotate in the second direction again, wherein a controller determines whether the rotation module touches the micro switch during rotation thereby converting the potential of the signal outputted from the micro switch from the second potential to the first potential, and performing step (e) when the rotation module touches the micro switch during rotation; and
  (e) defining rotating in the second direction for extending the latch.

9. The method of claim 8 further comprises step (f) driving the rotation module of the electronic lock to rotate in the first direction for retracting the latch after step (e).

10. The method of claim 8 further comprising step (g) sending a warning signal via the controller showing the electronic lock is installed incorrectly when the rotation module does not touch the micro switch during rotation in step (d).

11. The method of claim 8, wherein the rotation module includes a rotation member and a driven member having a protruding portion used for touching the micro switch selectively, the rotation member is driven to rotate by a driver, and the rotation member in rotation drives the driven member to rotate, and wherein the rotation member rotates relative to the driven member because of engagement and disengagement between the rotation member and the driven member when the rotation member is unable to drive the driven member in rotation.

12. The method of claim 11, wherein the rotation member includes at least one recess and at least one blocking protrusion located in the recess, wherein the driven member includes an engaging portion, at least one limiting recess and at least one rolling member, the engaging portion is engaged within the recess, the at least one limiting recess is recessed on the engaging portion, and the at least one rolling member is limited in the limiting recess, and wherein the blocking protrusion contacts with the rolling member for driving the driven member in rotation when the rotation member is rotating.

13. The method of claim 12, wherein the electronic lock includes a housing and a plurality of elastic members, the driver, the rotation member and the driven member are installed on an installation surface of the housing, the driven member is located between the installation surface and the rotation member, and the elastic members are installed between the housing and the driven member.

14. The method of claim 13, wherein the blocking protrusion of the rotation member comprises a slope, the at least one rolling member contacts with the slope of the blocking protrusion when the rotation member drives the driven member to rotate, and wherein the at least one rolling member is pushed by the slope to make the driven member moving toward the installation surface for compressing the elastic members and making the blocking protrusion cross the rolling member when the driven member is unable to be driven to rotate.

* * * * *